(12) United States Patent
Nishimura et al.

(10) Patent No.: US 11,653,117 B2
(45) Date of Patent: May 16, 2023

(54) IMAGING DEVICE

(71) Applicant: Panasonic Intellectual Property Management Co., Ltd., Osaka (JP)

(72) Inventors: Kazuko Nishimura, Kyoto (JP); Yutaka Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/664,426

(22) Filed: May 23, 2022

(65) Prior Publication Data
US 2022/0286630 A1 Sep. 8, 2022

Related U.S. Application Data

(63) Continuation of application No. PCT/JP2020/040235, filed on Oct. 27, 2020.

(30) Foreign Application Priority Data

Dec. 23, 2019 (JP) .............................. JP2019-231609

(51) Int. Cl.
*H04N 25/65* (2023.01)
*H04N 25/77* (2023.01)
*H01L 27/146* (2006.01)

(52) U.S. Cl.
CPC .............. *H04N 25/65* (2023.01); *H04N 25/77* (2023.01)

(58) Field of Classification Search
CPC ...... H04N 25/65; H04N 25/77; H04N 25/616; H04N 25/75; H01L 27/14609; H01L 27/14643
See application file for complete search history.

(56) References Cited

U.S. PATENT DOCUMENTS 11,063,072 B2 * 7/2021 Sakakibara ............. H03M 1/08
2008/0273106 A1 * 11/2008 Amini ................... H03F 3/3022
330/258

(Continued)

FOREIGN PATENT DOCUMENTS

JP 2002-501718 1/2002
JP 2016-127593 7/2016

(Continued)

OTHER PUBLICATIONS

International Search Report of PCT application No. PCT/JP2020/040235 dated Jan. 19, 2021.

*Primary Examiner* — Marly S Camargo
(74) *Attorney, Agent, or Firm* — McDermott Will & Emery LLP

(57) ABSTRACT

An imaging device is provided with an amplification transistor having a gate connected to a charge accumulator, a feedback transistor of which the source or drain is electrically connected to the charge accumulator and the other is connected to the source or drain of the amplification transistor, a current supply that supplies a current to a first node, a first select transistor of which the source or drain is connected to the other of the amplification transistor, a second select transistor of which the source or drain is connected to the source or drain of the amplification transistor, a current source/voltage source switching circuit that selectively connects a current source or a first voltage supply circuit to the other of the first select transistor, and a second voltage supply circuit connected to the other of the second select transistor.

14 Claims, 9 Drawing Sheets

(56) References Cited

U.S. PATENT DOCUMENTS

| | | | |
|---|---|---|---|
| 2016/0190187 A1 | 6/2016 | Nishimura et al. | |
| 2016/0293654 A1* | 10/2016 | Tomekawa | H01L 27/146 |
| 2016/0360131 A1* | 12/2016 | Shimasaki | H04N 25/65 |
| 2019/0149756 A1* | 5/2019 | Yanagida | H04N 25/65 |
| 2019/0238768 A1 | 8/2019 | Yamada et al. | |
| 2021/0266485 A1* | 8/2021 | Kobayashi | H03M 1/56 |

FOREIGN PATENT DOCUMENTS

| | | |
|---|---|---|
| JP | 2019-134413 | 8/2019 |
| WO | 1999/053683 | 10/1999 |

* cited by examiner

IMAGING DEVICE

BACKGROUND

1. Technical Field

The present disclosure relates to an imaging device that captures images.

2. Description of the Related Art

In the field of imaging devices, there is a demand for noise reduction. In particular, it is desirable to reduce the kTC noise produced during a reset (also referred to as "reset noise").

For example, Japanese Unexamined Patent Application Publication No. 2016-127593 discloses a technology for reducing reset noise through in-pixel feedback.

SUMMARY

One non-limiting and exemplary embodiment provides an imaging device capable of reducing reset noise effectively.

In one general aspect, the techniques disclosed here feature an imaging device provided with: a pixel including a photoelectric converter that converts light into a signal charge, a charge accumulator that accumulates the signal charge, an amplification transistor having a gate connected to the charge accumulator, a feedback transistor of which one of a source or a drain is electrically connected to the charge accumulator and the other of the source or the drain is connected to one of a source or a drain of the amplification transistor, a current supply that supplies a current to a first node between the amplification transistor and the feedback transistor, and a first select transistor of which one of a source or a drain is connected to the other of the source or the drain of the amplification transistor; a second select transistor of which one of a source or a drain is connected to the one of the source or the drain of the amplification transistor; a current source/voltage source switching circuit that includes a current source and a first voltage supply circuit, and selectively connects one of the current source or the first voltage supply circuit to the other of the source or the drain of the first select transistor; and a second voltage supply circuit connected to the other of the source or the drain of the second select transistor.

According to the above aspect, an imaging device capable of reducing reset noise effectively is provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Hereinafter, specific examples of an imaging device and the like according to an aspect of the present disclosure will be described with reference to the drawings. Note that the embodiments described hereinafter all illustrate general or specific examples. Features such as numerical values, shapes, materials, structural elements, layout positions, and connection configurations of structural elements indicated in the following exemplary embodiments are merely examples, and are not intended to limit the present disclosure. Note that each diagram is a schematic diagram, and does not necessarily illustrate a strict representation.

Embodiment 1

Figure 1:
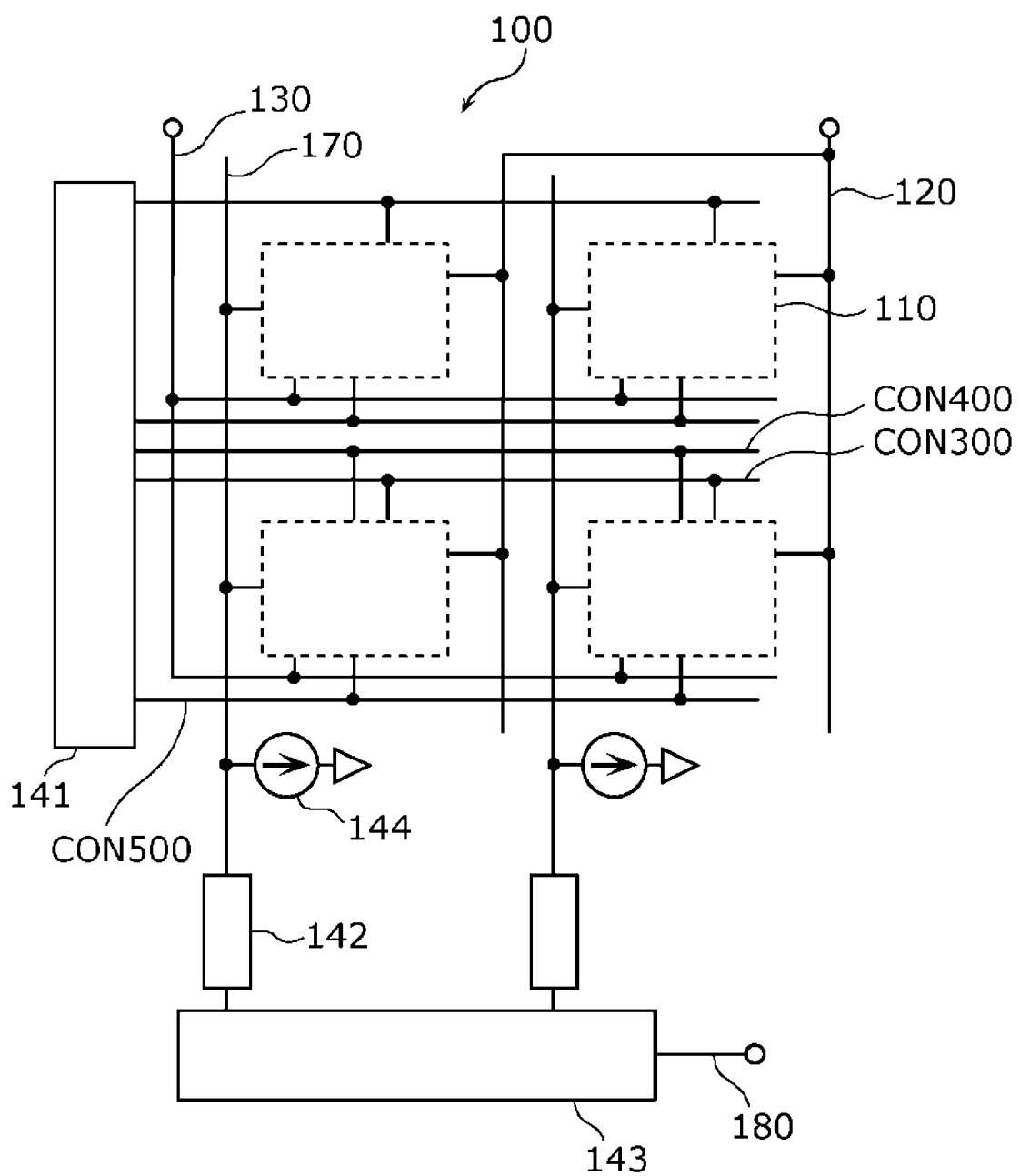
FIG. 1 is a schematic diagram illustrating a configuration of an imaging device according to Embodiment 1.

FIG. 1 is a schematic diagram illustrating a configuration of an imaging device 100 according to Embodiment 1. The imaging device 100 is a multilayer image sensor as an example, and includes a photoelectric conversion film which is layered onto a semiconductor substrate and which photoelectrically converts incident light.

The imaging device 100 is provided with a plurality of pixels 110 and peripheral circuits. In the imaging device 100, a photosensitive region (pixel region) is formed by arranging the plurality of pixels 110 in a two-dimensional array. Note that the plurality of pixels 110 may also be arranged in a one-dimensional line. In this case, the imaging device 100 is a line sensor. Herein, the plurality of pixels 110 are described as being arranged in an array in a row direction and a column direction. The column direction refers to the direction in which columns extend in the pixel array formed by the arrangement of the pixels in an array, and the row direction refers to the direction in which rows extend in the pixel array.

Each of the plurality of pixels 110 is connected to a power supply line 120. A power supply voltage is supplied through the power supply line 120 to each of the plurality of pixels 110.

In addition, each of the plurality of pixels 110 is connected to a storage control line 130. The same fixed voltage applied to the entire photoelectric conversion film is supplied to each of the plurality of pixels 110 through the storage control line 130. However, in the case of controlling the pixels so as to suppress variations or the like, the photoelectric conversion film may also be divided into several regions, and a different voltage may be supplied to each of the regions. A plurality of voltages may also be supplied to the entire photoelectric conversion film or several regions thereof.

The peripheral circuits include a vertical scan circuit 141, a column signal processing circuit 142, a horizontal signal readout circuit 143, and a current source 144. The vertical scan circuit is also referred to as a row scan circuit, and the horizontal signal readout circuit is also referred to as a column scan circuit. The column signal processing circuit 142 and the current source 144 may be disposed in each column in the pixel array. A number n of column signal processing circuits 142 and current sources 144 may also be disposed with respect to every column in the pixel array, or one of each may be disposed every m columns.

Hereinafter, an example of the configuration of the peripheral circuits will be described.

The vertical scan circuit 141 is connected to a select control signal line CON500, an amplification control signal line CON300, and a reset control signal line CON400. The select control signal line is also referred to as an address signal line. The vertical scan circuit 141 applies a predetermined voltage to the select control signal line CON500, and thereby selects, in units of rows, a plurality of the pixels 110 disposed in each row of the pixel array. With this arrangement, a readout of the signal voltage from the selected pixels 110 is executed.

The column signal processing circuit 142 is disposed in each column of the pixel array, and is electrically connected to each of the pixels 110 disposed in each column through a vertical signal line 170 disposed in each column. The vertical signal line is also referred to as a signal readout signal line. The column signal processing circuit 142 performs noise suppression signal processing as typified by correlated double sampling and analog-to-digital conversion (AD conversion) on signals read out from the pixels 110.

The horizontal signal readout circuit 143 is connected to the plurality of column signal processing circuits 142 to read out signals from the plurality of column signal processing circuits 142 and output a signal to a horizontal shared signal line 180.

Each pixel 110 includes a photoelectric converter that converts light into an electrical signal and a signal readout circuit that reads out a signal charge converted by the photoelectric converter.

Next, the structure of the pixels 110 will be described with reference to FIGS. 2A, 2B, and 2C.

Figure 2A:
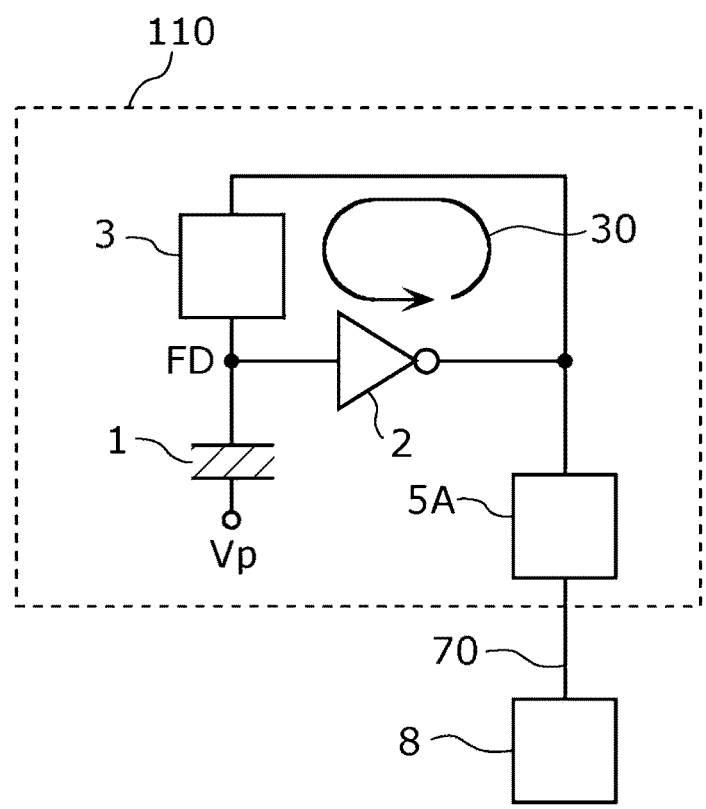
FIG. 2A is a schematic diagram illustrating an exemplary configuration of a pixel according to Embodiment 1.

FIG. 2A is a schematic diagram illustrating an exemplary circuit configuration of one of the pixels 110.

As illustrated in FIG. 2A, the pixel 110 is provided with a photoelectric converter 1, an amplifier 2, a feedback controller 3, a charge accumulator FD, and a power supply selector 5A.

The photoelectric converter 1 converts light into signal charge.

The charge accumulator FD accumulates the signal charge converted by the photoelectric converter 1.

A signal readout circuit is formed by the amplifier 2, the feedback controller 3, the charge accumulator FD, and the power supply selector 5A.

Figure 2B:
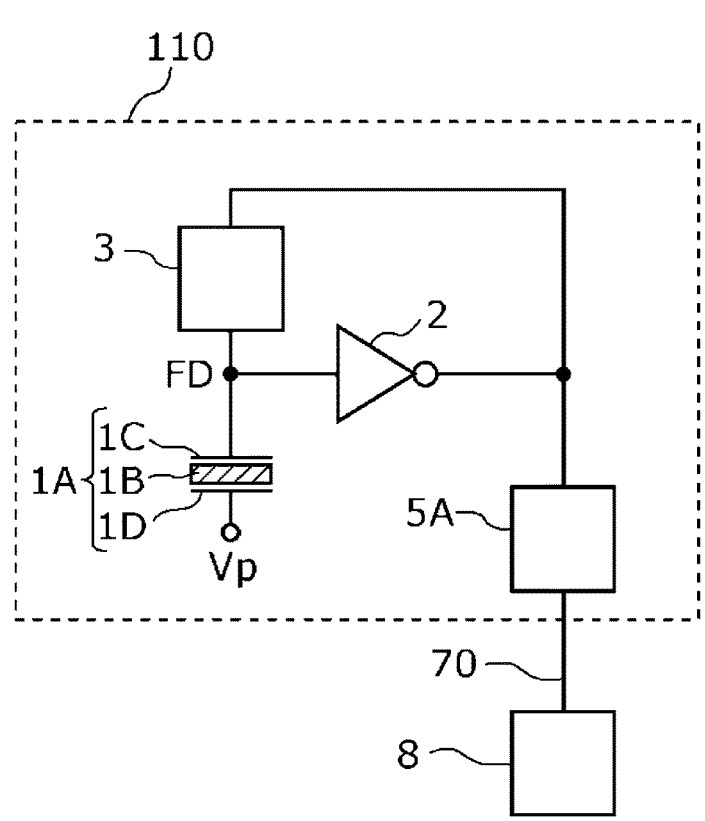
FIG. 2B is a schematic diagram illustrating a configuration example of a photodetector according to Embodiment 1.
Figure 2C:
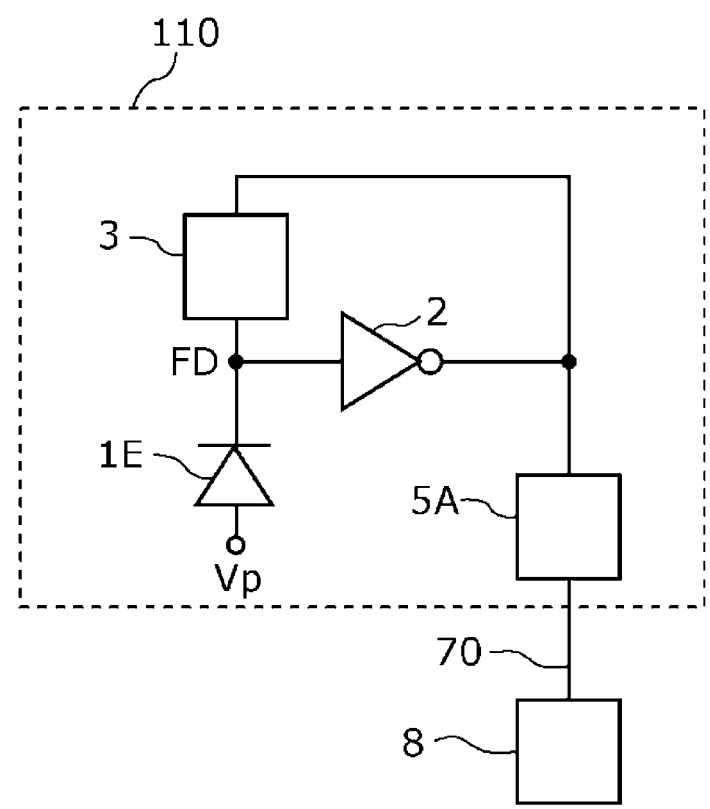
FIG. 2C is a schematic diagram illustrating a configuration example of a photodetector according to Embodiment 1.

FIG. 2B is a schematic diagram illustrating a configuration example of a photodetector 1A as one example of the photoelectric converter 1 illustrated in FIG. 1, and FIG. 2C is a schematic diagram illustrating a configuration example of a photodetector 1E as one example of the photoelectric converter 1 illustrated in FIG. 1.

For example, as illustrated in FIG. 2B, the photoelectric converter 1 may be achieved by the photodetector 1A using a photoelectric conversion film, such as an organic photoelectric conversion film 1B for example.

For example, as illustrated in FIG. 2B, the photodetector 1A includes an upper electrode 1C, a lower electrode 1D, and the organic photoelectric conversion film 1B sandwiched in between. By applying a reference voltage Vp to the upper electrode 1C and connecting one end of a node forming the charge accumulator FD to the lower electrode 1D, an electric field is generated, and signal charge converted by the photodetector 1A may be accumulated in the charge accumulator FD. The reference voltage Vp is supplied through the storage control line 130 illustrated in FIG. 1.

For example, as illustrated in FIG. 2B, the photoelectric converter 1 may be achieved by the photodetector 1E using a photodiode. By applying a ground potential or the reference voltage Vp to one end of the photodiode and connecting one end of the node forming the charge accumulator FD to the other end of the photodiode, signal charge converted by the photodetector 1E may be accumulated in the charge accumulator FD. The ground potential or reference voltage Vp is supplied through the storage control line 130 illustrated in FIG. 1.

The photoelectric converter 1 may also be achieved by another element having a photoelectric conversion function.

Returning to FIG. 2A, the description of the configuration of the pixel 110 will continue.

The charge accumulator FD is connected to the photoelectric converter 1 by a wiring layer. The charge accumulator FD is additionally connected to the input of the amplifier 2.

Figure 3:
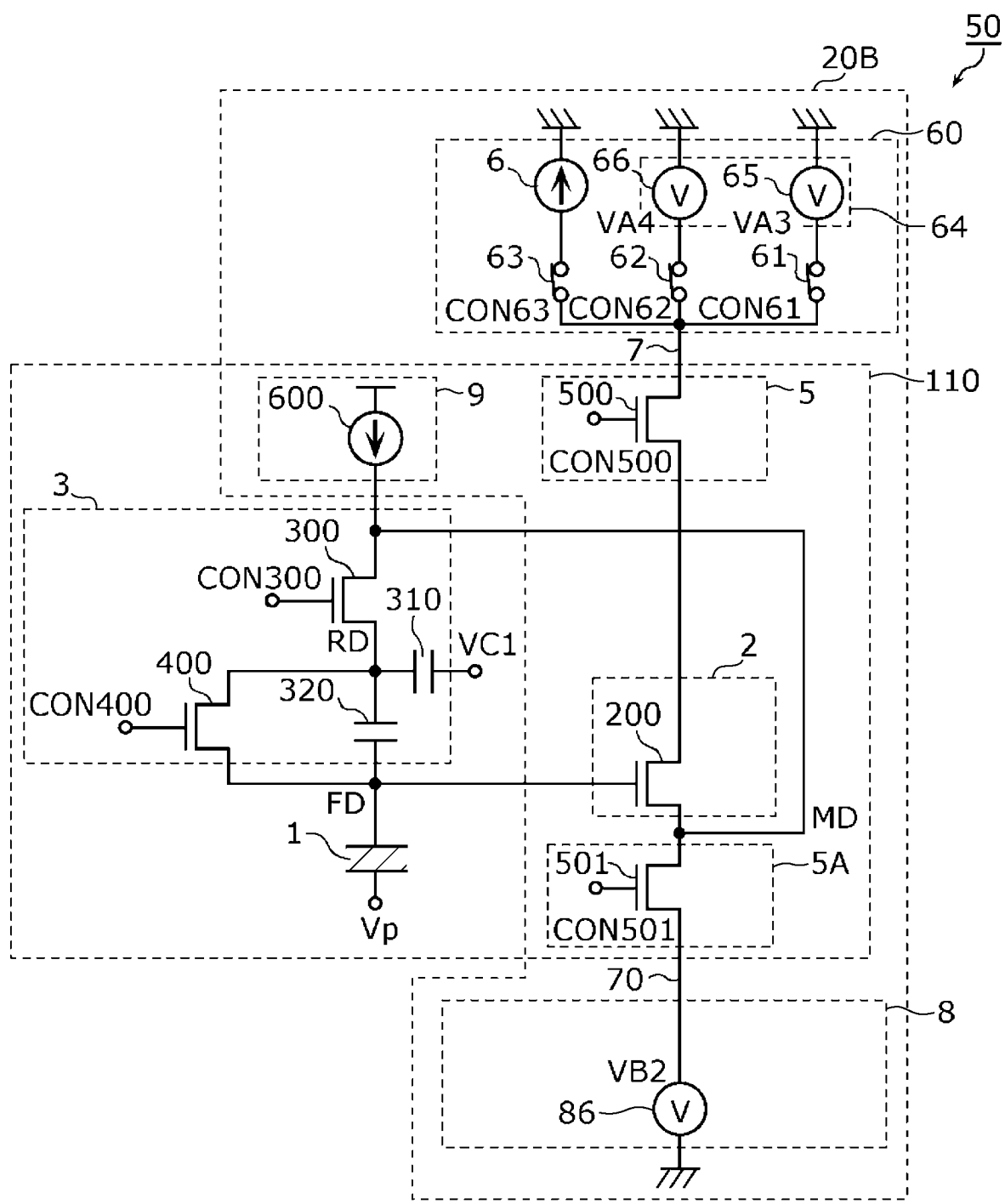
FIG. 3 is a schematic diagram illustrating a configuration of a signal readout circuit according to Embodiment 1.

The amplifier 2 amplifies a signal corresponding to the signal charge accumulated in the charge accumulator FD, and outputs the amplified signal to the feedback controller 3 and an output selector 5 (see FIG. 3).

The amplifier 2 and the feedback controller 3 form a feedback circuit 30. The signal read out from the charge accumulator FD is fed back by the feedback circuit 30 to the charge accumulator FD through the amplifier 2 and the feedback controller 3.

The power supply selector 5A is connected to a power supply line 70. The power supply line 70 corresponds to the power supply line 120 illustrated in FIG. 1. The power supply line 70 is connected to a voltage circuit 8.

In the imaging device 100 having the above configuration, the power supply selector 5A is disconnected or in other words in an off state during a desired period, such as the period in which the feedback circuit 30 is formed, for example. With this arrangement, the influence of the load, or in other words the time constant, of the power supply line 70 can be suppressed, and noise suppression can be sped up.

Hereinafter, details about the signal readout circuit will be described.

FIG. 3 is a schematic diagram illustrating the configuration of a signal readout circuit 50. In FIG. 3, structural elements similar to the structural elements already illustrated in FIGS. 1, 2A, 2B, and 2C are denoted with the same signs.

As illustrated in FIG. 3, the signal readout circuit 50 includes a charge accumulator FD, an amplifier 2, a feedback controller 3, a current supply 9, an output selector 5, a power supply selector 5A, a current source/voltage source switching circuit 60, and a voltage circuit 8. Hereinafter, the voltage circuit 8 is also referred to as the second voltage supply circuit 8.

As illustrated in FIG. 3, the pixel 110 includes the charge accumulator FD, the amplifier 2, the feedback controller 3, the current supply 9, the output selector 5, and the power supply selector 5A from the signal readout circuit 50 in addition to the photoelectric converter 1.

As illustrated in FIG. 3, the amplifier 2 includes an amplification transistor 200. The feedback controller 3 includes a feedback transistor 300, a noise retainer RD, a reset transistor 400, a first capacitor 320, and a second capacitor 310. The output selector 5 includes a first select transistor 500. The power supply selector 5A includes a second select transistor 501.

In other words, the pixel 110 includes the photoelectric converter 1, the charge accumulator FD, the amplification transistor 200, the feedback transistor 300, the current supply 9, the first select transistor 500, the second select transistor 501, the first capacitor 320, the second capacitor 310, and the reset transistor 400.

The gate of the amplification transistor 200 is connected to the charge accumulator FD.

One of the source or the drain of the feedback transistor 300 is connected to the charge accumulator FD through the first capacitor 320. In other words, one end of the first capacitor 320 is connected to the charge accumulator FD, and the other end of the first capacitor 320 is connected to one of the source or the drain of the feedback transistor 300. The other of the source or the drain of the feedback transistor 300 is connected to one of the source or the drain of the amplification transistor 200. Here, the node between one of the source or the drain of the feedback transistor 300 and the first capacitor 320 is referred to as the noise retainer RD. The signal from the charge accumulator FD is provided as negative feedback to the charge accumulator FD through the amplification transistor 200, the feedback transistor 300, and the first capacitor 320.

One of the source or the drain of the reset transistor 400 is connected to the charge accumulator FD. The reset transistor 400 initializes the potential of the charge accumulator FD. The other of the source or the drain of the reset transistor 400 is connected to the noise retainer RD. In other words, the reset transistor 400 is connected in parallel to the first capacitor 320.

One end of the second capacitor 310 is connected to one of the source or the drain of the feedback transistor 300. The other end of the second capacitor 310 is connected to a reference potential VC1 inside the pixel 110 or outside the pixel 110.

The current supply 9 includes a current source 600. The current supply 9 supplies a current to a first node MD between the amplification transistor 200 and the feedback transistor 300.

One of the source or the drain of the first select transistor 500 is connected to the other of the source or the drain of the amplification transistor 200.

One of the source or the drain of the second select transistor 501 is connected to one of the source or the drain of the amplification transistor 200.

The current source/voltage source switching circuit 60 includes a current source 6 and a first voltage supply circuit 64, and selectively connects either the current source 6 or the first voltage supply circuit 64 to the other of the source or the drain of the first select transistor 500. Here, the other of the source or the drain of the first select transistor 500 is selectively connected to either the current source 6 or the first voltage supply circuit 64 through a signal readout line 7. The current source 6 corresponds to the current source 144 illustrated in FIG. 1. The signal readout line 7 corresponds to the vertical signal line 170 illustrated in FIG. 1.

The second voltage supply circuit 8 is connected to the other of the source or the drain of the second select transistor 501. Here, the other of the source or the drain of the second select transistor 501 is connected to the second voltage supply circuit 8 through the power supply line 70.

Here, kTC noise is generated by switching the reset transistor 400 and the feedback transistor 300 to the off state. Of these, with regard to the kTC noise in the feedback transistor 300, the magnitude of the kTC noise imparted to the voltage of the charge accumulator FD is $$\sqrt{\frac{Cfd}{Cs}} \times \frac{Cc}{Cc+Cfd}$$

times the case where one or the source or the drain of the feedback transistor 300 is connected to the charge accumulator FD directly without providing the first capacitor 320 and the second capacitor 310 in the pixel 110. Here, Cfd, Cc, and Cs indicate the capacitance of the charge accumulator FD, the capacitance of the first capacitor 320, and the capacitance of the second capacitor 310, respectively.

In this way, the greater the capacitance Cs of the second capacitor 310, the smaller is the noise itself that is generated. Also, the smaller the capacitance Cc of the first capacitor 320, the larger is the attenuation ratio. Consequently, by appropriately setting the capacitance Cc of the first capacitor 320 and the capacitance Cs of the second capacitor 310, the kTC noise can be lower sufficiently.

Note that when the reset transistor 400 and the feedback transistor 300 are in the off state, the second capacitor 310 is connected to the charge accumulator FD through the first capacitor 320. At this point, consider the case where the charge accumulator FD and the second capacitor 310 are connected directly without going through the first capacitor 320. In this case, the substantial capacitance of the charge accumulator FD is (Cfd+Cs). Accordingly, in the case where the capacitance Cs of the second capacitor 310 is relatively large, the substantial capacitance of the charge accumulator FD also takes a large value, and a high gain is not obtained. The high gain referred to here may also be called a high SN ratio. For this reason, in the present embodiment, the second capacitor 310 is connected to the charge accumulator FD through the first capacitor 320. For this reason, the substantial capacitance of the charge accumulator FD is (Cfd+ (CcCs)/(Cc+Cs)). In the case where the capacitance Cc of the first capacitor 320 is relatively small and the capacitance Cs of the second capacitor 310 is relatively large, the substantial capacitance of the charge accumulator FD is roughly (Cfd+Cc). In other words, the increase in the substantial capacitance of the charge accumulator FD is small. In this way, by connecting the second capacitor 310 having a larger capacitance than the first capacitor 320 to the charge accumulator FD through the first capacitor 320 having a relatively small capacitance, a drop in the conversion gain can be suppressed.

The amplification control signal line CON300 is connected to the gate of the feedback transistor 300, and the state of the feedback transistor 300 is determined by the potential on the amplification control signal line CON300. For example, in the case where the amplification control signal line CON300 is at an intermediate potential between the high level and the low level, the feedback transistor 300 turns on and the signal from the charge accumulator FD is fed back. In the case where the amplification control signal line CON300 is at a low level, the feedback transistor 300 turns off and the signal from the charge accumulator FD is not fed back. In the case where the amplification control signal line CON300 is at a high level, the feedback transistor 300 turns on, the signal from the charge accumulator FD is fed back, and the potential is equalized between the noise retainer RD and the first node MD.

The select control signal line CON500 is connected to the gate of the first select transistor 500, and the state of the first select transistor 500 is determined by the potential on the select control signal line CON500. For example, in the case where the select control signal line CON500 is at a high level, the first select transistor 500 turns on, and the amplification transistor 200 and the signal readout line 7 are electrically connected. In the case where the select control signal line CON500 is at a low level, the first select transistor 500 turns off, and the amplification transistor 200 and the signal readout line 7 are electrically disconnected.

A power supply select signal line CON501 is connected to the gate of a second select transistor 401, and the state of the second select transistor 401 is determined by the potential on the power supply select signal line CON501. For example, in the case where the power supply select signal line CON501 is at a high level, the second select transistor 501 turns on, and the amplification transistor 200 and the power supply line 70 are electrically connected. In the case where the power supply select signal line CON501 is at a low level, the second select transistor 501 turns off, and the amplification transistor 200 and the power supply line 70 are electrically disconnected. The power supply select signal line CON501 may also be connected to the vertical scan circuit 141, for example. In other words, the vertical scan circuit 141 may supply a predetermined voltage to the power supply select signal line CON501.

The first voltage supply circuit 64 includes a voltage source 65 that supplies a reference potential VA3 and a voltage source 66 that supplies a reference potential VA4 higher than the reference potential VA3.

The voltage source 65, the voltage source 66, and the current source 6 are connected to the signal readout line 7 through a switch element 61, a switch element 62, and a switch element 63, respectively. The signal readout line 7 is switched among the voltage source 65, the voltage source 66, and the current source 6 according to the signals applied to switch element control signal lines CON61, CON62, and CON63 connected to the switch elements 61, 62, and 63, respectively. The switch element control signal lines CON61, CON62, and CON63 may also be connected to the vertical scan circuit 141, for example. In other words, a predetermined voltage may be applied to the switch element control signal lines CON61, CON62, and CON63 from the vertical scan circuit 141.

The second voltage supply circuit 8 includes a voltage source 86 that supplies a control potential VB2 to the power supply line 70.

An amplification circuit 20B includes the second voltage supply circuit 8, the second select transistor 501, the amplification transistor 200, the current source 600, the first select transistor 500, the signal readout line 7, and the current source/voltage source switching circuit 60. In the present embodiment, the amplification circuit 20B includes the current source 6 in the direction flowing out from the first node MD inside the current source/voltage source switching circuit 60, and the current source 600 in the direction flowing into the first node MD inside the pixel 110.

In the present embodiment, it is possible to switch between the use of the current source 6 and the current source 600.

Furthermore, it is possible to coordinate the current source 6 and the current source 600 with the control of the switch element of the current source/voltage source switching circuit 60. For example, when the potential at the source or the drain of the amplification transistor 200 is VA3 or VA4, the current source 600 may be selected to activate the feedback circuit 30. When the potential at the source or the drain of the amplification transistor 200 is VB2, the current source 6 may be selected to activate the amplification circuit 20B. Through the above operations, it is possible to switch the amplification circuit 20B between a mode of operating as a source-grounded amplification circuit with a high amplification factor and mode of operating as a source follower circuit with an amplification factor of substantially 1.

Furthermore, it is also possible to coordinate the current source 6 and the current source 600 with the control of the power supply select signal line CON501. For example, when the potential at the source or the drain of the amplification transistor 200 is VA3 or VA4, the second select transistor 501 may be turned off to disconnect the amplification transistor 200 and the power supply line 70. When the potential at the source or the drain of the amplification transistor 200 is VB2, the second select transistor 501 may be turned on to connect the amplification transistor 200 and the power supply line 70. Through the above operations, variations at the first node MD are not propagated to the power supply line 70 when the amplification circuit 20B is in the mode of operating as a source-grounded amplification circuit. Moreover, the first node MD is no longer influenced by the load on the power supply line 70.

The reset control signal line CON400 is connected to the gate of the reset transistor 400, and the state of the reset transistor 400 is determined by the potential on the reset control signal line CON400. For example, in the case where the potential on the reset control signal line CON400 is at a high level, the reset transistor 400 turns on, and the noise retainer RD and the charge accumulator FD are electrically connected. In the case where the potential on the reset control signal line CON400 is at a low level, the reset transistor 400 turns off, and the noise retainer RD and the charge accumulator FD are electrically connected through the first capacitor 320.

In Embodiment 1, the transistors included in the signal readout circuit 50 are described as NMOS transistors, but the polarity may also be reversed. That is, the transistors included in the signal readout circuit 50 may also be PMOS transistors. Obviously, properties such as the levels of the control signals and the potentials of the voltage sources are modified to suit the polarity of the transistors, and therefore a detailed description of such a modification is omitted here.

The signal readout circuit 50 with the above configuration performs a reset operation in a reset period in which the charge accumulator FD is reset, and performs a readout operation in a readout period in which the signal charge accumulated in the charge accumulator FD is read out. Furthermore, the reset period is divided into a pre-reset period and a noise suppression period.

Hereinafter, operations by the signal readout circuit 50 will be described with reference to the drawings.

Figure 4:
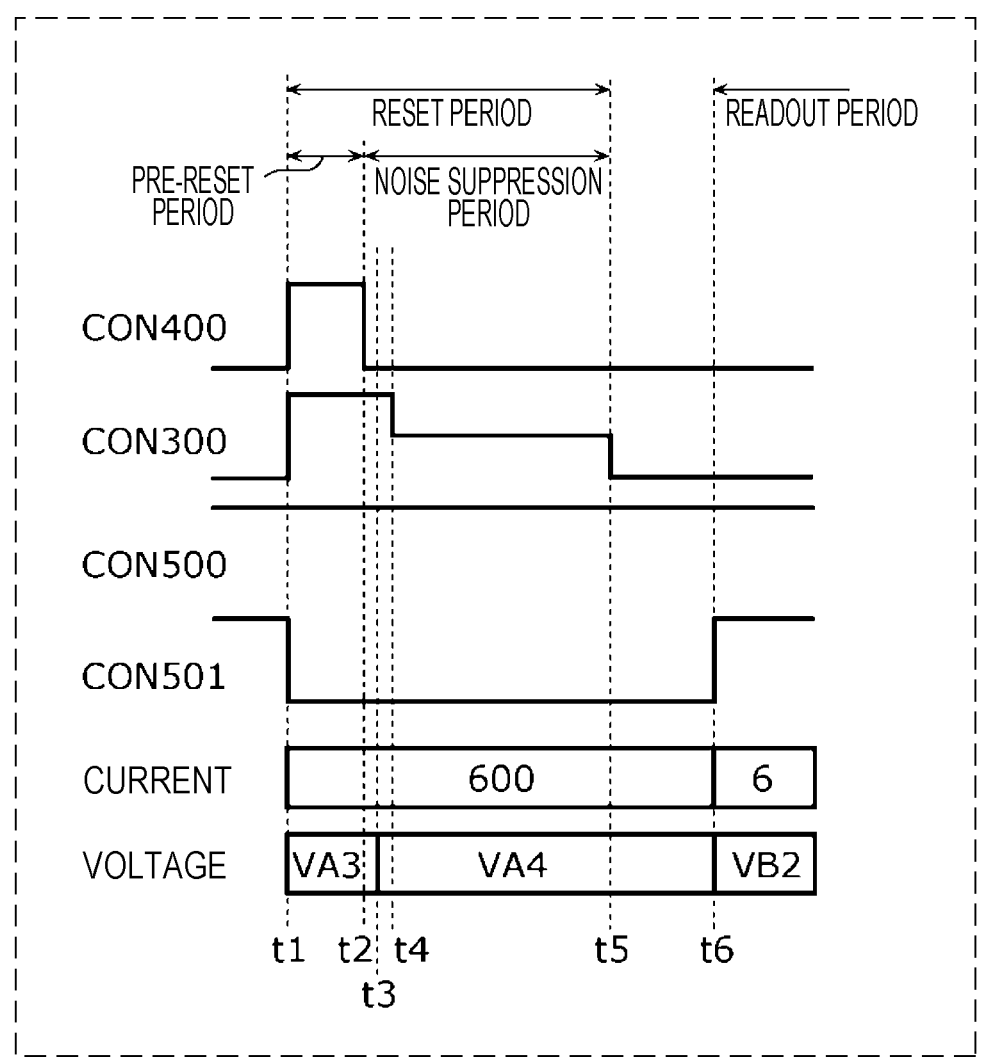
FIG. 4 is a timing chart illustrating operations by the signal readout circuit according to Embodiment 1.

FIG. 4 is a timing chart illustrating operations by the signal readout circuit 50.

<Operations in Pre-Reset Period>

At a time t1, the current source 6 is disconnected from the signal readout line 7, and a current from the current source 600 inside the pixel 110 is supplied. In this state, the potentials on the amplification control signal line CON300 and the reset control signal line CON400 are set to the high level, and the feedback transistor 300 and the reset transistor 400 turn on. Also, the potential on the power supply select signal line CON501 is set to the low level, the second select transistor 501 turns off, and the connection between the pixel 110 and the power supply line 70 is broken. Furthermore, the current source/voltage source switching circuit 60 is controlled to set the potential at the source or the drain of the amplification transistor 200 to VA3. With this arrangement, the potential of the charge accumulator FD is set to a reset potential VRST.

<Operations in Noise Suppression Period>

Next, at a time t2, the potential on the power supply select signal line CON501 is maintained at the low level, the second select transistor 501 turns off, and the connection between the pixel 110 and the second voltage supply circuit 8 is broken. Furthermore, the potential on the reset control signal line CON400 is set to the low level while the current from the current source 600 inside the pixel 110 is being supplied. At this time, kTC noise remains in the charge accumulator FD. Thereafter, at a time t3, the current source/voltage source switching circuit 60 is controlled to set the potential at the source or the drain of the amplification transistor 200 to VA4, which is higher than VA3.

Thereafter, in the period from a time t4 to a time t5, the potential on the amplification control signal line CON300 is set to the control potential VB2, which is an intermediate potential between the high level and the low level. In the period from the time t4 to the time t5, the amplification circuit 20B operates in the source-grounded amplification mode. Provided that −A is the amplification factor, Cc is the capacitance of the first capacitor 320, and Cfd is the capacitance of the charge accumulator FD, the signal from the charge accumulator FD is amplified −A×Cc/(Cc+Cfd) times and fed back to the charge accumulator FD.

According to the operations in the period from the time t4 to the time t5, the kTC noise from the reset transistor 400 remaining in the charge accumulator FD at the time t5 is suppressed by the feedback operations by a factor of $$\frac{1}{1 + A \times \frac{Cc}{Cc + Cfd}}$$

times the kTC noise remaining in the charge accumulator FD at the time t2.

Also, the kTC noise generated in the feedback transistor 300 is suppressed by the feedback operations by a factor of $$\frac{1}{\sqrt{1 + A \times \frac{Cc}{Cc + Cfd}}}$$

and is furthermore multiplied by a factor of Cc/(Cfd+Cc) and transmitted to the charge accumulator FD. Consequently, the kTC noise remaining in the charge accumulator FD at the time t5 is $$\frac{1}{\sqrt{1 + A \times \frac{Cc}{Cc + Cfd}}} \times \frac{Cc}{Cfd + Cc} \times \sqrt{\frac{Cfd}{Cs}}$$

times the kTC noise remaining in the charge accumulator FD at the time t2.

In the signal readout circuit 50, during the reset period, or in other words the combined period of the pre-reset period and the noise suppression period, a current is supplied from the current source 600 inside the pixel 110, and the connection between the pixel 110 and the power supply line 70 is broken. With this arrangement, problems caused by parasitic capacitive coupling between the power supply line 70 and nearby signal lines can be suppressed. Problems caused by parasitic capacitive coupling include, for example, variations in the voltage in the feedback operations for noise suppression and variations in the voltage due to changes in the supplied voltage causing variations in nearby signals and lengthening the time it takes to achieve signal convergence. Note that the voltage variations referred to here are the variations from the voltage setting VB2 during readout as a source follower to the reset voltage setting VA3 during pre-reset, to the voltage setting VA4 during noise suppression, and back to the voltage setting VB2 during readout as a source follower, for example. Also, the load on the power supply line 70 is not imposed on the pixel 110 during noise suppression, thereby obtaining an effect of speeding up convergence in the feedback circuit.

<Operations in Readout Period>

At a time t6, the current source/voltage source switching circuit 60 are controlled such that the source or the drain of the amplification transistor 200 goes to the control potential VB2. Thereafter, the potential on the power supply select signal line CON501 is set to the high level, the second select transistor 501 turns on, and the pixel 110 and the power supply line 70 are connected. At the same time, the supply of current to the pixel 110 from the current source 600 inside the pixel 110 is stopped, and the supply of current from the current source 6 is started. In this state, the amplification transistor 200 and the current source 6 forms a source follower circuit, and the signal readout line 7 goes to a potential corresponding to the potential of the charge accumulator FD. At this time, the amplification factor of the source follower circuit is approximately 1.

At the time t6, the voltage of the charge accumulator FD is substantially the potential of the reset voltage VRST, and in the readout period, the voltage is outputted to the signal readout line 7 with an amplification factor of approximately 1.

Here, random noise occurs as fluctuations in the output at the times when the charge signal converted by the photoelectric converter 1 is 0, or in other words, as the sum of squares of the kTC noise in the reset transistor 400 and the kTC noise in the feedback transistor 300, and in the noise suppression period, the signal charge converted by the photoelectric converter 1 is readout in a state in which the kTC noise in the reset transistor 400 is suppressed by a factor of $$\frac{1}{1 + A \times \frac{Cc}{Cc + Cfd}}$$

and the kTC noise in the feedback transistor 300 is suppressed by a factor of $$\frac{1}{\sqrt{1 + A \times \frac{Cc}{Cc + Cfd}}} \times \frac{Cc}{Cfd + Cc} \times \sqrt{\frac{Cfd}{Cs}}.$$

Note that in the imaging device 100, the signal readout line 7 may also be connected to a latter-stage circuit for detecting the signal on the signal readout line 7. Examples of the latter-stage circuit include, but are not limited to, a circuit configured to AD-convert the signal on the signal readout line 7 in each column. In addition, the imaging device 100 may also perform CDS for canceling out inconsistencies in the latter-stage circuit. Specifically, a reset operation may be performed again after reading out the signal charge in the readout period. After the completion of the above reset operation, a readout operation is performed again before performing photoelectric conversion in the photoelectric converter 1. With this arrangement, a reference voltage can be read out. CDS may be performed by taking the difference between the signal voltage and the reference voltage. In this way, the imaging device 100 may or may not perform CDS.

Also, the imaging device 100 is described as having an amplification factor of approximately 1 because the imaging device 100 is configured to read out the signal from the charge accumulator FD with a source follower circuit. However, the configuration is not limited to the above, and the amplification factor may also be set to a value other than 1 according to the demanded properties of the system, such as the S/N and the circuit range.

As described above, in the imaging device 100, a source-grounded amplification circuit is included in a feedback circuit for noise cancellation. This arrangement makes it possible to suppress random noise without being influenced by parasitic capacitance arising from the layout or the device.

Note that the imaging device 100 is configured to supply the reset voltage of the charge accumulator FD in the pre-reset period from the amplification transistor 200 through the noise retainer RD. However, the configuration is not limited to the above, and the reset voltage may also be supplied from the amplification transistor 200 through the first node MD, for example. Moreover, the reset voltage may also be supplied from a reference potential VR1 set to a desired voltage in advance. With this arrangement, the charge accumulator FD and the noise retainer RD can be reset to a fixed potential that does not depend on variations in the transistors. Consequently, it is possible to provide more favorable image data that does not depend on device variations.

Also, the power supply selector 5A is described as being provided inside the pixel 110, but the power supply selector 5A may also be disposed outside the pixel 110. In this case, a reduction in the pixel area may be attained and a speed up may be attained to the extent that the load of the voltage source 86 is not seen.

[Observations] According to the imaging device 100 with the above configuration, the direction of the current flowing through the signal readout line 7 in the reset period matches the direction of the current flowing through the signal readout line 7 in the readout period. For this reason, power supply voltage variations caused by the reversal of the direction of the current flowing through the signal readout line 7 can be reduced compared to an imaging device in which the direction of the current flowing through the signal readout line 7 in the reset period and the direction of the current flowing through the signal readout line 7 in the readout period are reversed. Consequently, the reset noise can be reduced effectively.

Furthermore, in the signal readout circuit 50, during the reset period, or in other words the combined period of the pre-reset period and the noise suppression period, a current is supplied from the current source 600 inside the pixel 110, and the connection between the pixel 110 and the power supply line 70 is broken. With this arrangement, noise problems caused by parasitic capacitive coupling between the power supply line 70 and nearby signal lines can be suppressed.

By using the above two configurations, it is possible to achieve an effect of suppressing parasitic capacitance between nearby signal lines and speeding up noise cancellation. However, either or both of the configurations may be provided depending on the demanded characteristics.

Embodiment 2

Hereinafter, an imaging device according to Embodiment 2, which is configured as a partial modification of the imaging device 100 according to Embodiment 1, will be described. In the following, structural elements of the imaging device according to Embodiment 2 that are similar to structural elements of the imaging device 100 according to Embodiment 1 will be treated as already-described structural elements, will be denoted with the same signs, and a detailed description will be omitted.

In the imaging device according to Embodiment 2, the pixel 110 from the imaging device 100 according to Embodiment 1 is changed to a pixel according to Embodiment 2.

Figure 5:
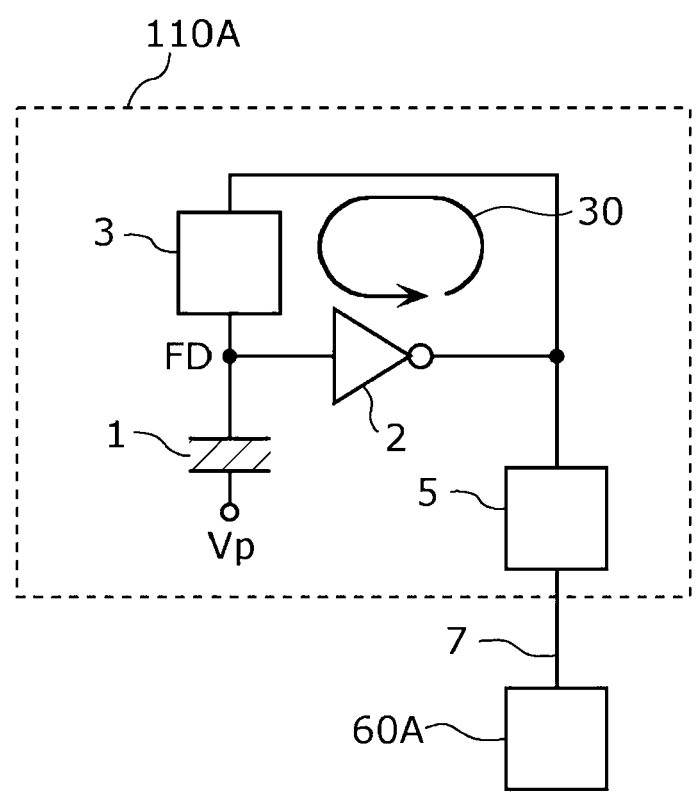
FIG. 5 is a schematic diagram illustrating an exemplary configuration of a pixel according to Embodiment 2.

FIG. 5 is a schematic diagram illustrating an exemplary circuit configuration of a pixel 110A according to Embodiment 2.

As illustrated in FIG. 5, the pixel 110A is provided with a photoelectric converter 1, an amplifier 2, a feedback controller 3, a charge accumulator FD, and an output selector 5.

A signal readout circuit is formed by the amplifier 2, the feedback controller 3, the charge accumulator FD, and the output selector 5.

The output selector 5 is connected to a signal readout line 7 shared in common with at least two pixels 110A. A signal amplified by the amplifier 2 is outputted to the signal readout line 7 through the output selector 5. The signal readout line 7 corresponds to the vertical signal line 170 illustrated in FIG. 1. The signal readout line 7 is connected to a current source circuit 60A.

According to the above configuration, in the imaging device according to Embodiment 2, the output selector 5 is disconnected or in other words in an off state during a desired period, such as the period in which the feedback circuit 30 is formed, for example. This arrangement achieves a configuration in which nearby signals coupled by parasitic capacitance are not influenced by variations on the signal readout line 7. Furthermore, according to the above configuration, in the imaging device according to Embodiment 2, the output selector 5 is disconnected during a desired period, such as the period in which the feedback circuit 30 is formed, for example. With this arrangement, the influence of the load (for example, the time constant) of the signal readout line 7 is suppressed and a speedup in noise suppression is achieved.

Hereinafter, details about the signal readout circuit will be described.

Figure 6:
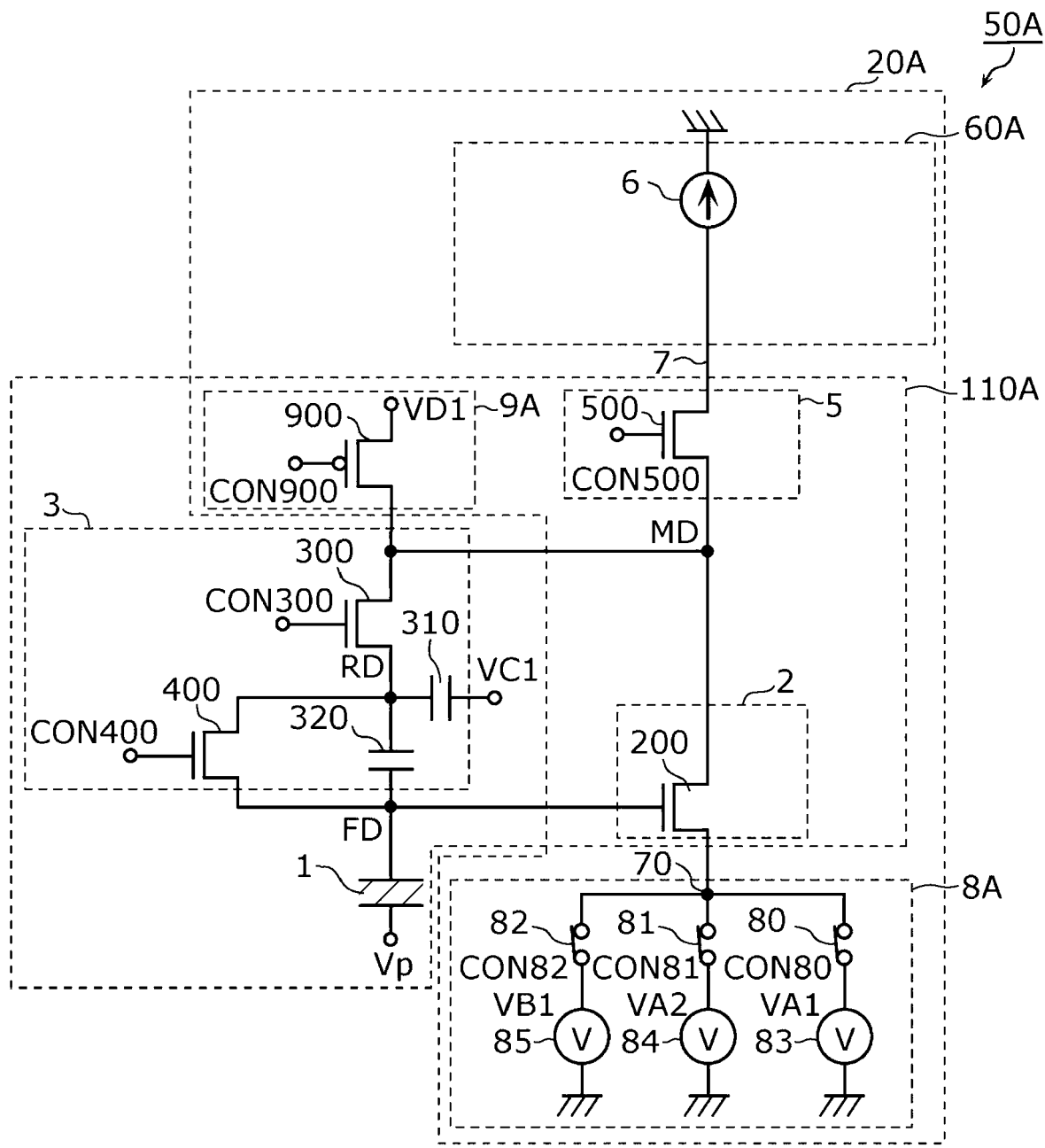
FIG. 6 is a schematic diagram illustrating a configuration of a signal readout circuit according to Embodiment 2.

FIG. 6 is a schematic diagram illustrating a configuration of a signal readout circuit 50A according to Embodiment 2. In FIG. 6, structural elements similar to the structural elements already illustrated in FIGS. 1, 2A, 2B, 2C, 3, and 5 are denoted with the same signs.

As illustrated in FIG. 6, the signal readout circuit 50A includes a charge accumulator FD, an amplifier 2, a feedback controller 3, a current supply 9A, an output selector 5, a current source circuit 60A, and a voltage circuit 8A. Hereinafter, the voltage circuit 8A is also referred to as the first voltage supply circuit 8.

As illustrated in FIG. 6, the pixel 110A includes the charge accumulator FD, the amplifier 2, the feedback controller 3, the current supply 9A, and the output selector 5 from the signal readout circuit 50A in addition to the photoelectric converter 1.

As illustrated in FIG. 6, the amplifier 2 includes an amplification transistor 200. The feedback controller 3 includes a feedback transistor 300, a noise retainer RD, a reset transistor 400, a first capacitor 320, and a second capacitor 310. The output selector 5 includes a first select transistor 500.

In other words, the pixel 110A includes the photoelectric converter 1, the charge accumulator FD, the amplification transistor 200, the feedback transistor 300, the current supply 9A, the first select transistor 500, the first capacitor 320, the second capacitor 310, and the reset transistor 400.

The gate of the amplification transistor 200 is connected to the charge accumulator FD.

One of the source or the drain of the feedback transistor 300 is connected to the charge accumulator FD through the first capacitor 320. In other words, one end of the first capacitor 320 is connected to the charge accumulator FD, and the other end of the first capacitor 320 is connected to one of the source or the drain of the feedback transistor 300. The other of the source or the drain of the feedback transistor 300 is connected to one of the source or the drain of the amplification transistor 200.

One of the source or the drain of the reset transistor 400 is connected to the charge accumulator FD. The other of the source or the drain of the reset transistor 400 is connected to the noise retainer RD. In other words, the reset transistor 400 is connected in parallel to the first capacitor 320.

One end of the second capacitor 310 is connected to one of the source or the drain of the feedback transistor 300. The other end of the second capacitor 310 is connected to a reference potential VC1 inside the pixel 110 or outside the pixel 110.

The current supply 9A includes a current supply transistor 900 and supplies current to the first node MD between the amplification transistor 200 and the feedback transistor 300 only in a partial period within the period for resetting the charge accumulator FD. Details about the period in which the current supply 9A supplies a current to the first node MD will be described later.

One of the source or the drain of the first select transistor 500 is connected to the first node MD. In other words, one of the source or the drain of the first select transistor 500 is connected to one of the source or the drain of the amplification transistor 200.

The current source circuit 60A includes the current source 6. The current source 6 is connected to the other of the source or the drain of the first select transistor 500. Here, the current source 6 is connected to the other of the source or the drain of the first select transistor 500 through the signal readout line 7. The current source 6 causes a current to flow in the direction flowing out from the first node MD. The current source 6 corresponds to the current source 144 illustrated in FIG. 1. The signal readout line 7 corresponds to the vertical signal line 170 illustrated in FIG. 1.

The first voltage supply circuit 8A is connected to the other of the source or the drain of the amplification transistor 200. The first voltage supply circuit 8A supplies at least two different voltages. Here, the other of the source or the drain of the amplification transistor 200 is connected to the first voltage supply circuit 8A through the power supply line 70. The power supply line 70 corresponds to the power supply line 120 illustrated in FIG. 1.

The first voltage supply circuit 8A includes a voltage source 83 that supplies a reference potential VA1, a voltage source 84 that supplies a potential VA2 higher than the reference potential VA1, and a voltage source 85 that supplies a control potential VB1.

The voltage source 83 is connected to the power supply line 70 through a switch element 80. The voltage source 84 is connected to the power supply line 70 through a switch element 81. The voltage source 85 is connected to the power supply line 70 through a switch element 82. The switch elements 80, 81, and 82 are connected to switch element control signal lines CON80, CON81, and CON82. Through the switch element control signal lines CON80, CON81, and CON82, the potential on the power supply line 70 is switched among VA1, VA2, and VB1.

An amplification circuit 20A includes the first voltage supply circuit 8A, the amplification transistor 200, the current supply transistor 900, the first select transistor 500, the signal readout line 7, and the current source circuit 60A.

In this configuration, the amplification circuit 20A includes the current supply transistor 900 inside the pixel 110A. The current supply transistor 900 supplies a current in the direction flowing into the first node MD. A gate voltage line CON900 is connected to the gate of the current supply transistor 900, and the state of the current supply transistor 900 is determined by the potential on the gate voltage line CON900. For example, the gate voltage line CON900 may be set to the low level or an intermediate voltage between the high level and the low level only during a partial period within the period for resetting the charge accumulator FD, thereby activating the feedback circuit 30 and successively setting the charge accumulator FD, the noise retainer RD, and the first node MD to initial voltage values.

Furthermore, it is possible to coordinate the current source 6 and the current supply transistor 900 with the control of the switch element of the first voltage supply circuit 8A. For example, when the potential at the source or the drain of the amplification transistor 200 is VA1 or VA2, the current supply transistor 900 is selected to activate the feedback circuit 30. When the potential at the source or the drain of the amplification transistor 200 is VB1, the current source 6 is selected to activate the amplification circuit 20A. Through the above operations, it is possible to switch the amplification circuit 20A between a mode of operating as a source-grounded amplification circuit with a high amplification factor and mode of operating as a source follower circuit with an amplification factor of substantially 1.

The above configuration makes it possible to switch between using the current source 6 and the current supply transistor 900.

Furthermore, it is also possible to coordinate the control of the current source 6 and the current supply transistor 900 with the control of the select control signal line CON500. For example, when the potential at the source or the drain of the amplification transistor 200 is VA1 or VA2, the first select transistor 500 may be turned off to disconnect the amplification transistor 200 and the signal readout line 7. When the potential at the source or the drain of the amplification transistor 200 is VB1, the first select transistor 500 may be turned on to connect the amplification transistor 200 and the signal readout line 7. Through the above operations, variations are not propagated to the signal readout line 7 when the amplification circuit 20A is in the mode of operating as a source-grounded amplification circuit, and in addition, the first node MD is no longer influenced by the load on the signal readout line 7.

The reset control signal line CON400 is connected to the gate of the reset transistor 400, and the state of the reset transistor 400 is determined by the potential on the reset control signal line CON400. For example, in the case where the potential on the reset control signal line CON400 is at a high level, the reset transistor 400 turns on, and the noise retainer RD and the charge accumulator FD are electrically connected. In the case where the potential on the reset control signal line CON400 is at a low level, the reset transistor 400 turns off, and the noise retainer RD and the charge accumulator FD are connected only by the first capacitor 320.

In Embodiment 2, the transistors included in the signal readout circuit 50A are described as NMOS transistors, but the polarity may also be reversed. That is, the transistors included in the signal readout circuit 50A may also be PMOS transistors. Obviously, properties such as the levels of the control signals and the potentials of the voltage sources are modified to suit the included transistors, and therefore a detailed description of such a modification is omitted here.

The signal readout circuit 50A with the above configuration performs a reset operation in a reset period in which the charge accumulator FD is reset, and performs a readout operation in a readout period in which the signal charge accumulated in the charge accumulator FD is read out. Furthermore, the reset period is divided into a pre-reset period and a noise suppression period.

Hereinafter, operations performed by the signal readout circuit 50A will be described with reference to the drawings.

Figure 7:
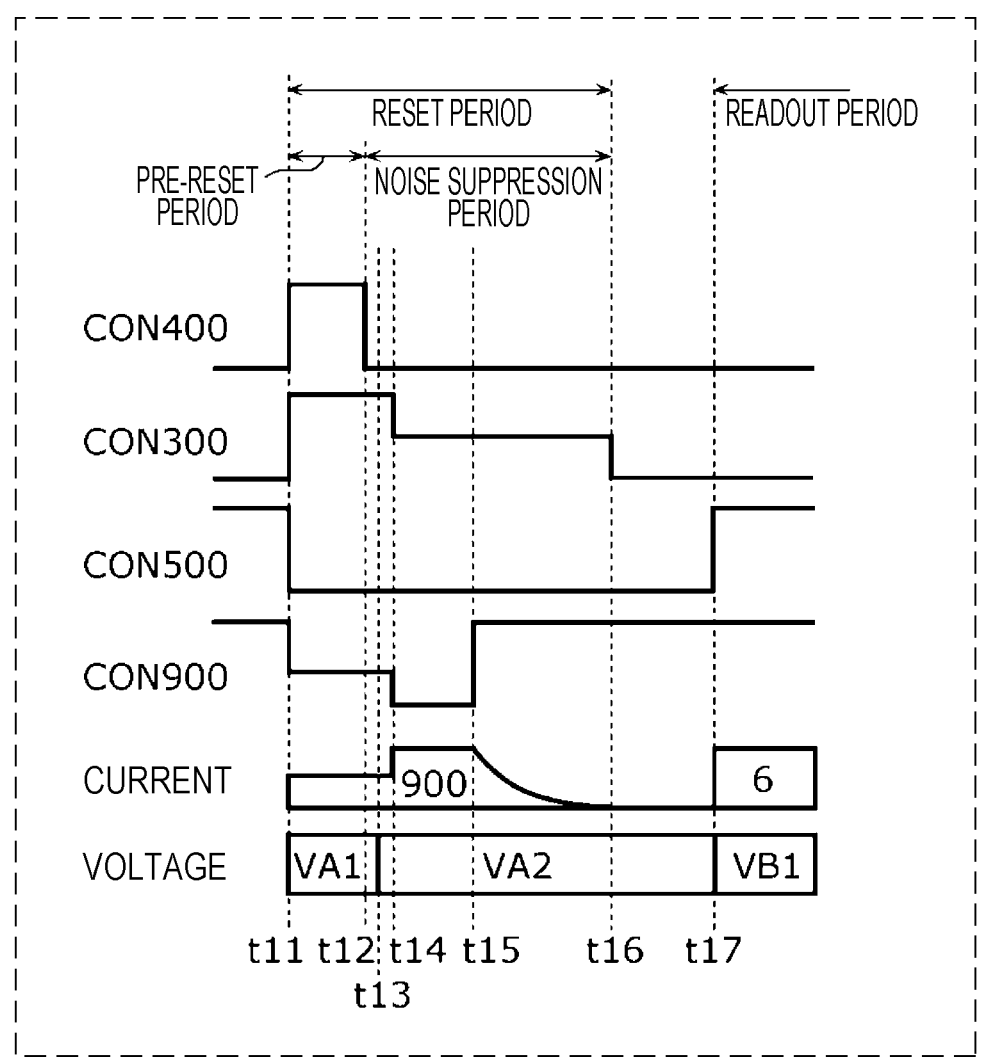
FIG. 7 is a timing chart illustrating operations by the signal readout circuit according to Embodiment 2.

FIG. 7 is a timing chart illustrating operations by the signal readout circuit 50A.

<Operations in Pre-Reset Period>

At a time t11, the potential on the select control signal line CON500 is set to the low level, thereby turning off the first select transistor 500 and disconnecting the current source 6 from the signal readout line 7. Also, by setting the potential on the gate voltage line CON900 to an intermediate voltage between the high level and the low level, the initial voltage of the charge accumulator FD is set and the feedback circuit 30 is activated.

In this state, the potentials on the amplification control signal line CON300 and the reset control signal line CON400 are set to the high level, and the feedback transistor 300 and the reset transistor 400 are set to the on state. Also, by controlling the first voltage supply circuit 8A to set the potential at the source or the drain of the amplification transistor 200 to VA1, the potential of the charge accumulator FD is set to the reset potential VRST.

<Operations in Noise Suppression Period>

Next, at a time t12, the potential on the select control signal line CON500 is maintained at the low level, and the potential on the reset control signal line CON400 is set to the low level while a tiny current flows through current supply transistor 900 inside the pixel 110A. At this time, kTC noise remains in the charge accumulator FD. Thereafter, at a time t13, the second voltage supply circuit 8 is controlled to set the potential at the source or the drain of the amplification transistor 200 to VA2, which is higher than VA1.

Thereafter, in the period from a time t14 to a time t16, the potential on the amplification control signal line CON300 is set to the control potential VB1, which is an intermediate potential between the high level and the low level, and in the partial period from the time t14 to a time t15 within the period from the time t14 to the time t16, the potential on the gate voltage line CON900 is set to the high level, thereby causing a large current to flow through the current supply transistor 900 momentarily. In the period from the time t14 to the time t16, the amplification circuit 20A operates in the source-grounded amplification mode with an amplification factor of −A. Provided that Cc is the capacitance value of the feedback capacitance, and Cfd is the capacitance of the charge accumulator FD, the signal from the charge accumulator FD is amplified −A×Cc/(Cc+Cfd) times and fed back to the charge accumulator FD.

According to the operations in the period from the time t14 to the time t16, the kTC noise from the reset transistor 400 remaining in the charge accumulator FD at the time t16 is suppressed by the feedback operations by a factor of $$\frac{1}{1+A\times\frac{Cc}{Cc+Cfd}}$$

times the kTC noise remaining in the charge accumulator FD at the time t12.

Also, the kTC noise generated in the feedback transistor 300 is suppressed by the feedback operations by a factor of $$\frac{1}{\sqrt{1+A\times\frac{Cc}{Cc+Cfd}}}$$

and is furthermore multiplied by a factor of Cc/(Cfd+Cc) and transmitted to the charge accumulator FD. Consequently, the kTC noise remaining in the charge accumulator FD at the time t15 is $$\frac{1}{\sqrt{1+A\times\frac{Cc}{Cc+Cfd}}}\times\frac{Cc}{Cfd+Cc}\times\sqrt{\frac{Cfd}{Cs}}$$

times the kTC noise remaining in the charge accumulator FD at the time t12.

In the signal readout circuit 50A, during the reset period, or in other words the combined period of the pre-reset period and the noise suppression period, a tiny current or a momentarily large current is made to flow through the current supply transistor 900 inside the pixel 110A, and the connection between the pixel 110A and the signal readout line 7 is broken. With this arrangement, problems caused by parasitic capacitive coupling between the signal readout line 7 and nearby signal lines can be suppressed. Problems caused by parasitic capacitive coupling refer to, for example, variations in the voltage in the feedback operations for noise suppression and variations in the voltage due to changes in the supplied voltage causing variations in nearby signals and lengthening the time it takes to achieve signal convergence. Note that the voltage variations referred to here are the variations from the voltage setting VB1 during readout as a source follower, to the reset voltage setting VA1 during pre-reset, to the voltage setting VA2 during noise suppression, and back to the voltage setting VB1 during readout as a source follower, for example. Also, the load on the power supply line 70 is not imposed on the pixel 110 during noise suppression, thereby obtaining an effect of speeding up convergence in the feedback circuit.

Also, although the gate voltage line CON900 is controlled in the present configuration, a source voltage VD1 of the current supply transistor may also be controlled to achieve similar effects.

<Operations in Readout Period>

At a time t17, the first voltage supply circuit 8A is controlled such that the source or the drain of the amplification transistor 200 goes to the control potential VB1. Thereafter, the potential on the select control signal line CON500 is set to the high level, the first select transistor 500 turns on, and the pixel 110A and the current source 6 are connected. At the same time, the potential on the gate voltage line CON900 is set to the high level, and the current supply transistor 900 inside the pixel 110A turns off. In this state, the amplification transistor 200 and the current source 6 forms a source follower circuit, and the signal readout line 7 goes to a potential corresponding to the potential of the charge accumulator FD. At this time, the amplification factor of the source follower circuit is approximately 1.

At the time t17, the voltage of the charge accumulator FD is substantially the potential of the reset voltage VRST, and in the readout period, the voltage is outputted to the signal readout line 7 with an amplification factor of approximately 1.

Here, random noise occurs as fluctuations in the output at the times when the charge signal converted by the photoelectric converter 1 is 0, or in other words, as the sum of squares of the kTC noise in the reset transistor 400 and the kTC noise in the feedback transistor 300, and in the noise suppression period, the signal charge converted by the photoelectric converter 1 is readout in a state in which the kTC noise in the reset transistor 400 is suppressed by a factor of $$\frac{1}{1 + A \times \frac{Cc}{Cc + Cfd}}$$

and the kTC noise in the feedback transistor 300 is suppressed by a factor of $$\frac{1}{\sqrt{1 + A \times \frac{Cc}{Cc + Cfd}}} \times \frac{Cc}{Cfd + Cc} \times \sqrt{\frac{Cfd}{Cs}}.$$

Note that in the imaging device according to Embodiment 2, the signal readout line 7 may also be connected to a latter-stage circuit for detecting the signal on the signal readout line 7. Examples of the latter-stage circuit include, but are not limited to, a circuit configured to AD-convert the signal on the signal readout line 7 in each column. In addition, the imaging device according to Embodiment 2 may also perform CDS for canceling out inconsistencies in the latter-stage circuit. Specifically, a reset operation may be performed again after reading out the signal charge in the readout period. After the completion of the above reset operation, a readout operation is performed again before performing photoelectric conversion in the photoelectric converter 1. With this arrangement, a reference voltage can be read out. CDS may be performed by taking the difference between the signal voltage and the reference voltage. In this way, the imaging device according to Embodiment 2 may or may not perform CDS.

Also, the imaging device according to Embodiment 2 is described as having an amplification factor of approximately 1 because the imaging device 100 is configured to read out the signal from the charge accumulator FD with a source follower circuit. However, the configuration is not limited to the above, and the amplification factor may also be set to a value other than 1 according to the demanded properties of the system, such as the S/N and the circuit range, for example.

As described above, in the imaging device according to Embodiment 2, by including the source-grounded amplification circuit in the feedback circuit for noise cancellation, it is possible to suppress random noise without being influenced by parasitic capacitance arising from the layout or the device.

Note that the imaging device according to Embodiment 2 is configured to supply the reset voltage of the charge accumulator FD in the pre-reset period from the amplification transistor 200 through the noise retainer RD. However, the reset voltage may also be supplied from the amplification transistor 200 to the first node MD. Moreover, the reset voltage may also be supplied from a reference potential VR1 set to a desired voltage in advance. With this arrangement, the charge accumulator FD and the noise retainer RD can be reset to a fixed potential that does not depend on variations in the transistors. Consequently, it is possible to provide more favorable image data that does not depend on device variations.

[Observations] According to the imaging device according to Embodiment 2 with the above configuration, the current supply 9 including the current supply transistor 900 supplies a current to the first node MD only in a partial period within the period for resetting the charge accumulator FD.

For this reason, the imaging device according to Embodiment 2 is capable of supplying a larger current to the feedback transistor 300 than an imaging device according to a comparative example provided with a current supply that supplies a current to the first node MD throughout the entire reset period. With this arrangement, the imaging device according to Embodiment 2 can shorten the feedback period compared to the imaging device according to the comparative example.

Consequently, according to the imaging device according to Embodiment 2, the reset noise can be reduced more effectively than an imaging device of the related art.

Furthermore, in the signal readout circuit 50A, during the reset period, or in other words the combined period of the pre-reset period and the noise suppression period, a current is supplied from the current supply transistor 900 inside the pixel 110A, and the connection between the pixel 110A and the signal readout line 7 is broken. With this arrangement, noise problems caused by parasitic capacitive coupling between the signal readout line 7 and nearby signal lines can be suppressed.

By using the above two configurations, it is possible to achieve an effect of suppressing parasitic capacitance between nearby signal lines and speeding up noise cancellation. However, either or both of the configurations may be provided depending on the demanded characteristics.

Embodiment 3

Hereinafter, an imaging device according to Embodiment 3 having a multilayer structure containing at least two layered substrates will be described. In the following, structural elements of the imaging device according to Embodiment 3 that are similar to structural elements of the imaging device 100 according to Embodiment 1 will be treated as already-described structural elements, will be denoted with the same signs, and a detailed description will be omitted.

Figure 8:
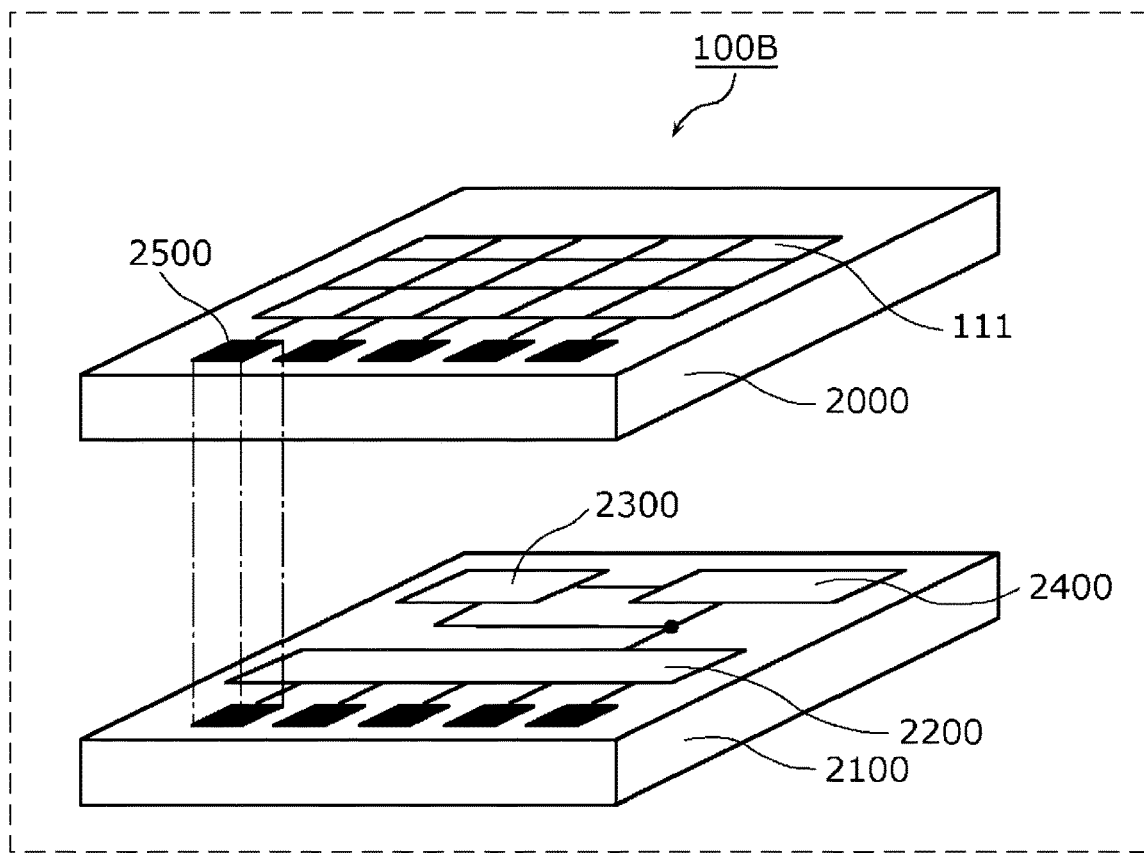
FIG. 8 is an exploded view illustrating a configuration of an imaging device according to Embodiment 3.

FIG. 8 is an exploded perspective view illustrating a configuration of an imaging device 100B according to Embodiment 3.

As illustrated in FIG. 8, the imaging device 100B includes a first substrate 2000 and a second substrate 2100 layered on top of each other.

A pixel array 111 in which a plurality of pixels 110 are arranged in an array is disposed on the first substrate 2000.

An analog-to-digital conversion circuit 2200, a memory 2400, and a computational processing circuit 2300 are disposed on the second substrate 2100. The analog-to-digital conversion circuit 2200 converts an analog signal obtained as the output signal from each pixel 110 forming the pixel array 111 to a digital signal. The memory 2400 accumulates the digital signal converted by the analog-to-digital conversion circuit 2200. The computational processing circuit 2300 processes the digital signal converted by the analog-to-digital conversion circuit 2200.

The first substrate 2000 and the second substrate 2100 are electrically connected by an interconnect 2500.

In the imaging device 100B having the above configuration, the output selector 5 and the power supply selector 5A are disposed on the first substrate 2000. By disposing the output selector 5 and the power supply selector 5A on the first substrate 2000, the load of the interconnect 2500 is not included in the load of the wiring, and capacitive coupling by the wiring can be suppressed. Moreover, with the above configuration, the output selector 5 and the power supply selector 5A may also be disposed on the interconnect of the second substrate 2100.

Note that herein, FIG. 8 is used to describe a configuration in which the imaging device 100B has a multilayer structure with the two substrates of the first substrate 2000 and the second substrate 2100 layered on top of each other. However, the imaging device 100B may be configured in another way insofar as the imaging device 100B has a multilayer structure with at least two substrates layered on top of each other. For example, the imaging device 100B may also be configured to have a multilayer structure with three or more substrates layered on top of each other, and may also be configured to have a multilayer structure in which a plurality of child substrates are layered in parallel on top of a single substrate.

Additionally, the interconnect 2500 may be configured to be disposed with respect to each column of the pixel array 111, with respect to each region of the pixel array 111, or with respect to each pixel 110.

Embodiment 4

The imaging device 100 according to Embodiment 1, the imaging device according to Embodiment 2, and the imaging device 100B according to Embodiment 3 are applicable as an imaging device in a camera system such as a digital video camera or a digital still camera.

Hereinafter, a camera system according to Embodiment 4 in which the imaging device 100 according to Embodiment 1 is applied as an imaging device will be described.

Figure 9:
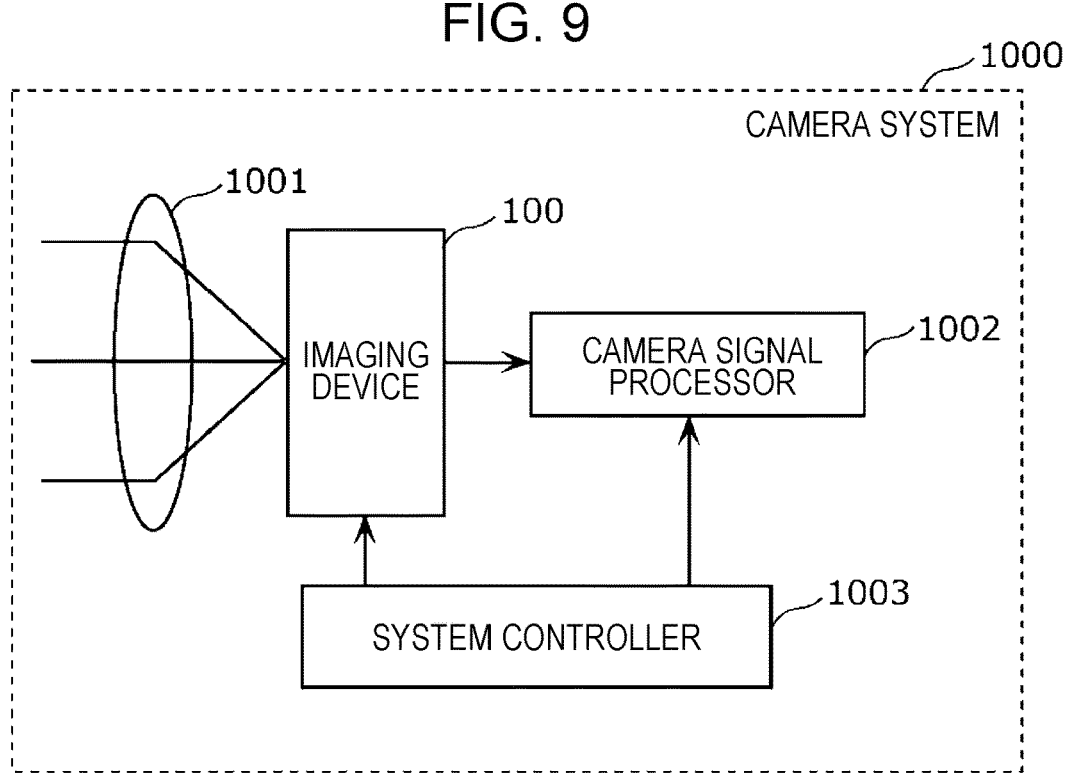
FIG. 9 is a block diagram illustrating a configuration of a camera system according to Embodiment 4.

FIG. 9 is a block diagram illustrating a configuration of a camera system 1000 according to Embodiment 4. In the following, structural elements of the camera system 1000 that are similar to structural elements of the imaging device 100 according to Embodiment 1 will be treated as already-described structural elements, will be denoted with the same signs, and a detailed description will be omitted.

As illustrated in FIG. 9, the camera system 1000 is provided with an imaging device 100, a lens 1001, a camera signal processing circuit 1002, and a system controller 1003.

The lens 1001 condenses external light onto the pixel array of the imaging device 100.

The camera signal processing circuit 1002 performs signal processing on the output signal from the imaging device 100, and outputs an image or data to external equipment.

The system controller 1003 controls the imaging device 100 and the camera signal processing circuit 1002.

According to the camera system 1000 with the above configuration, by applying the imaging device 100 as the imaging device, variations in the vertical signal lines are suppressed, and by extension, the noise characteristics are improved. Additionally, the reset noise can be reduced effectively. Therefore, the camera system 1000 is capable of accurate charge readout, and as a result, a camera system with favorable image characteristics can be achieved.

(Supplement)

As above, Embodiments 1 to 4 have been described as illustrative examples of the technology disclosed in the present application. However, the technology according to the present disclosure is not limited to the above and is also applicable to embodiments obtained by the appropriate modification, substitution, addition, or removal of elements without departing from the gist of the present disclosure.

(1)

In Embodiment 1, the imaging device 100 is described as having a configuration in which the pixel 110 is provided with the current supply 9 as a circuit that supplies a current to the first node MD. In contrast, another configuration example of the imaging device 100 is conceivable in which, instead of the current supply 9, the pixel 110 is provided with the current supply 9A according to Embodiment 2 that supplies a current to the first node MD only in a partial period within the period for resetting the charge accumulator FD.

By configuring the imaging device 100 such that the pixel 110 is provided with the current supply 9A instead of the current supply 9, like the imaging device according to Embodiment 2, it is possible to supply a large current to the first node MD compared to the imaging device according to the comparative example provided with a current supply that supplies a current to the first node MD throughout the reset period. With this arrangement, the imaging device 100 provided with the current supply 9A instead of the current supply 9 can shorten the feedback period compared to the imaging device according to the comparative example.

Consequently, according to the imaging device 100 provided with the current supply 9A instead of the current supply 9, the feedback period can be shortened compared to the imaging device according to the comparative example.

(2)

In Embodiment 1, the imaging device 100 is described as having a configuration in which the second select transistor 501 is provided inside the pixel 110. However, the imaging device 100 is not necessarily limited to a configuration in which the second select transistor 501 is provided inside the pixel 110, and the imaging device 100 may also have a configuration in which the second select transistor 501 is provided outside the pixel 110.

By configuring the imaging device 100 such that the second select transistor 501 is provided outside the pixel 110, the pixel 110 can be reduced in size.

Also, the imaging device 100 may have a configuration in which a single second select transistor 501 is provided with respect to every single pixel 110 or a configuration in which a single second select transistor 501 is provided with respect to a plurality of pixels 110.

By configuring the imaging device 100 such that a single second select transistor 501 is provided with respect to a plurality of pixels 110, the size of the pixel array can be reduced compared to a configuration in which a single second select transistor 501 is provided with respect to every single pixel 110.

(3)

In the imaging device according to Embodiment 2, the current supply 9A is described as including the current supply transistor 900. However, the current supply 9A is not necessarily limited to the above configuration insofar as it is possible to supply a current to the first node MD only in a partial period with the period for resetting the charge accumulator FD. For example, the current supply 9A may be configured to include a plurality of transistors, or to include structural elements other than transistors without including a transistor.

(4)

In the imaging device according to Embodiment 2, the first voltage supply circuit 8A is described as being provided with the voltage source 83 that supplies VA1, the voltage source 84 that supplies VA2, and the voltage source 85 that supplies VB1, and as being configured to supply at least two different voltages by switching the selected voltage source. However, the first voltage supply circuit 8A is not necessarily limited to the above configuration insofar as it is possible to supply at least two different voltages. For example, the first voltage supply circuit 8A may also have a configuration provided with a single voltage source that switches between and outputs at least two different voltages.

(5)

An imaging device according to one aspect of the present disclosure is provided with: a pixel including a photoelectric converter that converts light into a signal charge, a charge accumulator that accumulates the signal charge, an amplification transistor having a gate connected to the charge accumulator, a feedback transistor of which one of a source or a drain is electrically connected to the charge accumulator and the other of the source or the drain is connected to one of a source or a drain of the amplification transistor, a current supply that supplies a current to a first node between the amplification transistor and the feedback transistor, and a first select transistor of which one of a source or a drain is connected to the other of the source or the drain of the amplification transistor; a second select transistor of which one of a source or a drain is connected to the one of the source or the drain of the amplification transistor; a current source/voltage source switching circuit that includes a current source and a first voltage supply circuit, and selectively connects one of the current source or the first voltage supply circuit to the other of the source or the drain of the first select transistor; and a second voltage supply circuit connected to the other of the source or the drain of the second select transistor.

According to the imaging device with the above configuration, the reset noise can be reduced effectively.

Also, the current supply may supply the current to the first node only in a partial period within a period for resetting the charge accumulator.

Also, the second select transistor may be included in the pixel.

Also, in a first period in which the second select transistor is on, the amplification transistor may output a signal corresponding to an amount of the signal charge accumulated in the charge accumulator to an outside of the pixel, and in a second period in which the second select transistor is off, the amplification transistor may provide a signal corresponding to a potential of the charge accumulator to the charge accumulator as negative feedback.

Also, the current source/voltage source switching circuit may connect the current source in the first period and connect the first voltage supply circuit in the second period.

An imaging device according to another aspect of the present disclosure is provided with: a pixel including a photoelectric converter that converts light into a signal charge, a charge accumulator that accumulates the signal charge, an amplification transistor having a gate connected to the charge accumulator, a feedback transistor of which one of a source or a drain is electrically connected to the charge accumulator and the other of the source or the drain is connected to one of a source or a drain of the amplification transistor, a current supply that supplies a current to a first node between the amplification transistor and the feedback transistor only in a partial period within a period for resetting the charge accumulator, and a first select transistor of which one of a source or a drain is connected to the first node; a current source connected to the other of the source or the drain of the first select transistor; and a first voltage supply circuit that is connected to the other of the source or the drain of the amplification transistor, and supplies at least two different voltages.

According to the imaging device with the above configuration, the reset noise can be reduced effectively.

Also, the current supply may include a current supply transistor.

Also, in a first period in which the first select transistor is on, the amplification transistor may output a signal corresponding to an amount of the signal charge accumulated in the charge accumulator to an outside of the pixel, and in a second period in which the first select transistor is off, the amplification transistor may provide a signal corresponding to a potential of the charge accumulator to the charge accumulator as negative feedback.

Also, the first voltage supply circuit may supply different voltages in the first period and the second period.

Also, an amplification factor of the amplification transistor may be different between the first period and the second period.

Also, the pixel may include a first capacitor of which one end is connected to the charge accumulator and another end is connected to one of a source or a drain of the feedback transistor, and a second capacitor of which one end is connected to the one of the source or the drain of the feedback transistor.

Also, a capacitance of the second capacitor may be greater than a capacitance of the first capacitor.

Also, the imaging device may be further provided with a reset transistor for initializing a potential of the charge accumulator, of which one of a source or a drain is connected to the charge accumulator.

Also, the other of the source or the drain of the reset transistor may be connected to the one of the source or the drain of the feedback transistor.

The present disclosure is widely applicable to imaging devices that capture images.

What is claimed is:

1. An imaging device comprising:
a pixel including:
- a photoelectric converter that converts light into a signal charge;
- a charge accumulator that accumulates the signal charge;
- an amplification transistor having a gate connected to the charge accumulator;
- a feedback transistor of which one of a source or a drain is electrically connected to the charge accumulator and the other of the source or the drain is connected to one of a source or a drain of the amplification transistor;
- a current supply that supplies a current to a first node between the amplification transistor and the feedback transistor; and
- a first select transistor of which one of a source or a drain is connected to the other of the source or the drain of the amplification transistor;
a second select transistor of which one of a source or a drain is connected to the one of the source or the drain of the amplification transistor;
a current source/voltage source switching circuit that includes a current source and a first voltage supply circuit, and that selectively connects one of the current source or the first voltage supply circuit to the other of the source or the drain of the first select transistor; and
a second voltage supply circuit connected to the other of the source or the drain of the second select transistor.

2. The imaging device according to claim 1, wherein the current supply supplies the current to the first node only in a partial period within a period for resetting the charge accumulator.

3. The imaging device according to claim 1, wherein the second select transistor is included in the pixel.

4. The imaging device according to claim 1, wherein
in a first period in which the second select transistor is on, the amplification transistor outputs a signal corresponding to an amount of the signal charge accumulated in the charge accumulator to an outside of the pixel, and
in a second period in which the second select transistor is off, the amplification transistor negatively feeds back a signal corresponding to a potential of the charge accumulator to the charge accumulator.

5. The imaging device according to claim 4, wherein the current source/voltage source switching circuit connects the current source in the first period and connects the first voltage supply circuit in the second period.

6. An imaging device comprising:
a pixel including:
- a photoelectric converter that converts light into a signal charge;
- a charge accumulator that accumulates the signal charge;
- an amplification transistor having a gate connected to the charge accumulator;
- a feedback transistor of which one of a source or a drain is electrically connected to the charge accumulator and the other of the source or the drain is connected to one of a source or a drain of the amplification transistor;
- a current supply that supplies a current to a first node between the amplification transistor and the feedback transistor only in a partial period within a period for resetting the charge accumulator; and
- a first select transistor of which one of a source or a drain is connected to the first node;
a current source connected to the other of the source or the drain of the first select transistor; and
a first voltage supply circuit that is connected to the other of the source or the drain of the amplification transistor, and that supplies at least two different voltages.

7. The imaging device according to claim 6, wherein the current supply includes a current supply transistor.

8. The imaging device according to claim 6, wherein
in a first period in which the first select transistor is on, the amplification transistor outputs a signal corresponding to an amount of the signal charge accumulated in the charge accumulator to an outside the pixel, and
in a second period in which the first select transistor is off, the amplification transistor negatively feeds back a signal corresponding to a potential of the charge accumulator to the charge accumulator.

9. The imaging device according to claim 8, wherein the first voltage supply circuit supplies a first voltage in the first period and supplies a second voltage different from the first voltage in the second period.

10. The imaging device according to claim 4, wherein an amplification factor of the amplification transistor in the first period is different from an amplification factor of the amplification transistor in the second period.

11. The imaging device according to claim 1, wherein the pixel includes:
- a first capacitor of which one end is connected to the charge accumulator and another end is connected to one of a source or a drain of the feedback transistor; and
- a second capacitor of which one end is connected to the one of the source or the drain of the feedback transistor.

12. The imaging device according to claim 11, wherein a capacitance of the second capacitor is greater than a capacitance of the first capacitor.

13. The imaging device according to claim 1, further comprising:
a reset transistor for initializing a potential of the charge accumulator, of which one of a source or a drain is connected to the charge accumulator.

14. The imaging device according to claim 13, wherein the other of the source or the drain of the reset transistor is connected to the one of the source or the drain of the feedback transistor.

* * * * *